Jan. 24, 1956  J. H. GOULD  2,731,875
POLARIMETER
Filed Dec. 23, 1952

INVENTOR.
John H. Gould
BY
Howard L. Rose
AGENT

United States Patent Office 2,731,875
Patented Jan. 24, 1956

2,731,875
POLARIMETER

John H. Gould, Hyattsville, Md., assignor to the United States of America as represented by the Secretary of Commerce Application December 23, 1952, Serial No. 327,705

6 Claims. (Cl. 88—14)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to an improvement in polarimeters and in particular to a device for increasing the precision of the measurement of the optical rotation and rotatory dispersion characteristics of optically active substances.

The prior art method for the determination of optical rotation made use of a polarimeter which required that the rotation produced by a sample be read from a graduated circle. In these instruments the rays of light from a monochromatic source are rendered parallel by a field lens. The light then enters a polarizing prism where it is plane-polarized. In some cases another smaller prism, called the Lippich half-shade prism, is used following the polarizer prism. This prism intercepts some of the light, and being set at a slight angle to the polarizer it reduces the intensity of that portion of the beam transmitted by it. Both beams then pass through the substance under study. The extent of the rotation produced by the sample is determined by rotating an analyzing prism fixed to a graduated circular scale until the two fields of light have the same intensity. The amount by which the analyzer prism is turned can be read directly from the graduated circle. The precision of the determination depends upon the visual matching of the intensity of the two fields in the instrument. This process is subject to the operator's eye fatigue. Another source of error is the difficulty of reading the graduated scale correctly. A third disadvantage is that this instrument requires a costly graduated scale. The wave-length range of such an instrument is limited to that of the visual spectrum. In recent years photoelectric detectors have been used to increase the wave-length range of the instrument and to reduce operator error in the determination of the balance point. However, this instrument still depends upon a comparison of the relative intensities of the two beams, and this necessarily limits the accuracy of the instrument.

The primary object of the present invention is to provide for the measurement of the optical rotation and rotatory dispersion characteristics of a substance by means of a comparison of the phase of the transmitted light beams.

Another object of the present invention is to provide a polarimeter for making measurements of the optical rotation and rotatory dispersion characteristics of materials, which measurements may be largely independent of the intensity of the transmitted light.

Another object of the present invention is to provide for frequency multiplication, thereby producing phase multiplication and increasing the accuracy of the device.

Another object of the present invention is to provide a polarimeter which largely eliminates the human factor from the measurements.

In accordance with the present invention there is provided a polarimeter which makes use of frequency multiplication circuits to determine the phase change produced by an optically active substance. Parallel rays from a monochromatic source of light are admitted to the instrument through a polarizing prism. The sample whose characteristics are to be determined is inserted in only one half of the polarized beam produced by the prism. The light transmitted through the sample and that transmitted through the instrument alone impinge upon a rotating analyzing prism, and the light leaving this prism is caused to strike two photocells. The light which passed through the sample strikes one photocell, and the light which passed through the instrument strikes the other photocell. The voltage produced by each photocell is fed to an electronic frequency multiplier. The outputs of these multipliers are then fed to the phase detector. The frequency multiplier circuit not only multiplies the frequency but also multiplies the phase differences between the voltages produced by the photocells, and the instrument can therefore be made extremely sensitive.

Other uses and advantages of the invention will become apparent upon reference to the specification and drawings.

Figure 1:
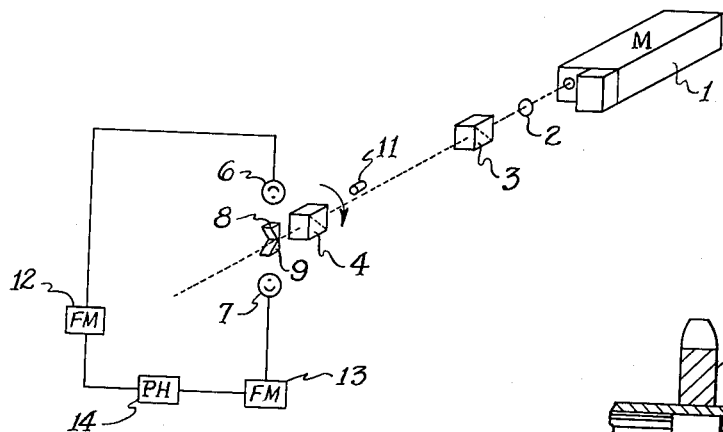
Figure 1 is a drawing showing one embodiment of the present invention.

Referring to Figure 1, there is provided a monochromatic source of light 1, a lens 2 for rendering the beam of light parallel to the axis of the instrument, a polarizing prism 3, which is used to produce a plane polarized beam, an analyzing prism 4, which is actually a continually rotating polarizing prism, and two photoelectric cells 6 and 7. The upper half of the beam is directed to the photocell 6 by means of the right-angled prism 8 which intercepts one half of the beam of light. The other half of the beam of light is directed to the photocell 7 through another prism 9. The specimen 11 of the material to be tested is inserted in the beam so that it intercepts the upper half of the beam only. Actually it is unimportant which half of the beam the specimen intercepts. The photocells 6 and 7 are connected to the frequency multiplying circuits 12 and 13. The outputs of these two circuits are fed to the phase detector 14.

In operation, the analyzer prism is set into rotation. The light falling upon the photocell 7, which is not intercepted by the specimen will vary in intensity at a rate equal to twice the rotational rate of the prism 4. The light reaches maximum intensity when the plane of polarization of the analyzer prism 4 is parallel to the plane of the polarized light. This pulsating light will be converted into electrical pulses by the photocell 7, the pulses having a frequency equal to the frequency of the light pulses. The light passing through the specimen 11 and rotating prism 4, and impinging upon the photocell 6, will vary at the same frequency as the light impinging upon the photocell 7, but the time at which this light reaches maximum intensity will be different from the time of maximum intensity of the light reaching the photocell 7. This is due to the rotation of the plane of the polarized light by the specimen 11. The output of each photoelectric cell is fed to a frequency multiplier for the purpose of multiplying the phase difference between these two signals. It is well known that frequency multiplication also multiplies phase difference between two sources of electrical energy. The output of the frequency multipliers is fed to the phase detector 14, which may be any one of a number of well known phase-detecting instruments. The specific rotation is by definition directly proportional to the observed rotation (read from the phase detector) and inversely proportional to the concentration of the specimen and the tube length in decimeters. The length of the specimen tube may be varied at will according to the requirements of the test.

It will be noted that, since this instrument operates purely on phase difference, the intensity of the light reaching the photocell 6 is unimportant as long as there is sufficient light to operate the photocell. A number of types of phototubes may be used, including a photomultiplier tube which will allow the cell to recognize very faint light. Since the intensity of the signals generated in the detectors is not important, studies may be made of the rotatory dispersion of substances in the neighborhood of their absorption bands.

By means of the frequency multiplication produced by frequency multipliers 12 and 13, it is possible to increase greatly the precision of the instrument. For example, multiplication of the frequency by a factor of 500 would give a precision equal to 0.002 degree. However, multiplication by a factor of $10^3$ would give a precision of 0.000002 degree. The above accuracies can be obtained with the present instrument only if the phase detector used is good to one degree in 360 degrees. This latter requirement can be easily met by permitting the phase difference between the two signals to go through as many 360-degree phase changes as are required to obtain the required phase detector precision. As previously pointed out, the amount of phase shift is not only dependent upon the optical rotation constant of the material being examined but also upon the length of the material parallel to the axis of the light. Therefore, by varying the length of the specimen it is possible to obtain any desired phase shift and thereby increase the accuracy of the instrument. For example, say that a specimen of unit length produces a rotation of 360 degrees and that the phase detector is good only to 2 degrees in 360. It is obvious that the instrument is not suitable for this application. However, since this instrument can measure to within 2 degrees in 360, it is apparent that it can measure within 2 degrees in 720. Therefore by providing a specimen of 2 unit lengths and thereby producing a rotation of 720 degrees the required accuracy of 1 degree in 360 can be obtained with an otherwise unsuitable instrument. The means for obtaining a variable length of specimen, where the specimen is liquid, is well known in the prior art and consists of a variable thickness cell. If solid materials are to be examined, several disks of different lengths can be provided or a wedge-shaped specimen, whose length may be varied by changing the portion of the specimen in the line of light, may be used. The frequency multipliers should have incorporated in them phase-shifting networks so that the phase detector can be "zeroed" before a specimen is inserted in the instrument.

Figure 2:
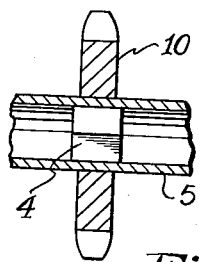
Figure 2 is a cross sectional view of the means for rotating the analyzer prism shown in Figure 1.

In Figure 2 there is shown a means for causing the analyzer prism 4 to rotate. The analyzer prism 4 is mounted inside of the hollow shaft 5, the axis of this shaft lying along the optical axis of the instrument. The gear 10 is mounted on the outside of the shaft 5 and is geared to a constant speed device which is not shown. This device may be a synchronous motor or some other synchronous drive means. The means for rotating the prism 4 is not meant to be limited to this showing as numerous other means are available such as mounting the prism inside of the hollow armature shaft of a constant speed or synchronous motor.

Figure 3:
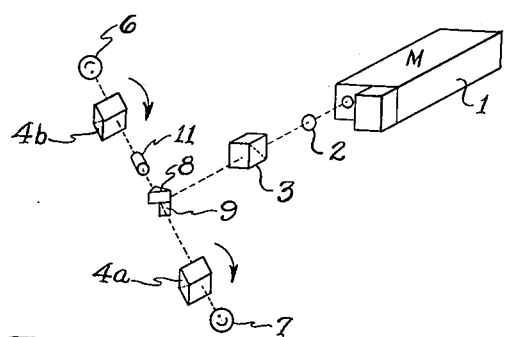
Figure 3 is a drawing showing another embodiment of the present invention.

In Figure 3 there is shown an alternate construction of the polarimeter which does not differ in essentials but only in the arrangement for splitting the two beams after they leave the polarizing prism. In this figure the light is split into two beams by the prisms 8 and 9, the light leaving the prism 8 passing through the rotating prism 4a to the photocell 7. The light leaving the prism 9 passes through the specimen 11, the rotating prism 4b, and impinges upon the photocell 6. It will be seen that the principles of operation are the same but the system above, employing two rotating prisms, offers the advantage that the beams of light are separated before the one beam passes through specimen 11, thereby preventing any mixing of the light beams.

It is necessary to the proper functioning of this system to insure that the analyzer prisms 4a and 4b have their polarizing planes lying in the same plane both before and during rotation. This can be accomplished by driving both gears in which the prisms are mounted from the shaft of a synchronous motor.

It will be apparent that the embodiments shown are only exemplary and that various modifications in construction and arrangement can be made within the scope of my invention as defined in the appended claims.

I claim:

1. A polarimeter for measuring the optical rotation and rotatory dispersion characteristics of a specimen, comprising a source of parallel rays of light, means for plane-polarizing the beam of light, means for passing a first portion of the polarized beam of light through the specimen, and means for determining the phase angle between the first portion of the beam and the remaining portion of the beam, said last-named means including continuously rotating analyzer prism means positioned to intercept both portions of the beam.

2. A polarimeter for measuring the optical rotation and rotatory dispersion characteristics of a specimen, comprising a source of parallel rays of light, a prism for plane-polarizing the light, means for passing a first portion of the polarized light through the specimen, analyzer-prism means positioned to intercept both portions of the light, means for rotating said analyzer prism means, a first and a second photosensitive means, means for directing the first portion of the light to said first photosensitive means and for directing the remaining portion of said light to said second photosensitive means and phase measuring means connected to the output of said photosensitive means.

3. A polarimeter for measuring the optical and rotary dispersion characteristics of a specimen, comprising a source of parallel rays of light, a prism for plane-polarizing the light, means for passing a first portion of the polarized light through the specimen, rotating analyzer prism means positioned to intercept both portions of the light, a first and a second photoelectric means, means for directing the first portion of light to said first photoelectric means and the remaining portion of the light to said second photoelectric means, and a phase detector connected to the outputs of said photoelectric means.

4. A polarimeter for measuring the optical rotation and rotatory dispersion characteristics of a specimen, comprising a source of parallel rays of light, a prism for plane-polarizing the light, means for passing a first portion of the polarized light through the specimen, rotating analyzer prism means positioned to intercept both portions of the polarized light, a first and a second photoelectric means, means for directing the first portion of light to said first photoelectric means, and the remaining portion of the light to said second photoelectric means, a first and a second frequency multiplier, said first and second frequency multipliers connected to the output of said first and second photoelectric means, respectively, and a phase detector connected to the outputs of said frequency multipliers.

5. A polarimeter for measuring the optical rotation and rotatory dispersion characteristics of a specimen, comprising a source of parallel rays of light, a prism for plane-polarizing the light, means for passing a first portion of the polarized light through the specimen, a rotating analyzer prism positioned to intercept both portions of the polarized light, a first and a second photoelectric cell, means for directing the first portion of the light to said first photoelectric cell and the remaining portion of the light to said second photoelectric cell, a first and a second frequency multiplier connected to the output of said first and second photoelectric cells, respectively, and a phase detector connected to the outputs of said frequency multipliers.

6. A polarimeter for measuring the optical rotation and rotatory dispersion characteristics of a specimen, comprising a source of parallel rays of light, a prism for plane-polarizing the light, means for dividing the polarized light into a first and a second beam of polarized light, a first analyzer prism and the specimen positioned in the path of the first beam of light, a second analyzer prism positioned in the path of the second beam of light, means for rotating said analyzer prisms in synchronism, a first and a second photocell positioned to intercept the first and second beams of light, respectively, a first and a second frequency multiplier connected to the output of said first and second photoelectric cells, respectively, and a phase detector connected to the outputs of said frequency multipliers.

References Cited in the file of this patent

UNITED STATES PATENTS

| 2,032,128 | Horsfield | Feb. 25, 1936 |
| 2,503,808 | Earl et al. | Apr. 11, 1950 |

OTHER REFERENCES

Harris et al., "Prism and Sector Photoelectric Photometers for Determination of Concentrations in Gaseous or Liquid Systems"; Journal of the Optical Society of America, vol. 31, pages 263 through 267, March, 1941.